United States Patent
Yamashita

(10) Patent No.: US 10,041,787 B2
(45) Date of Patent: Aug. 7, 2018

(54) OBJECT DETECTION DEVICE

(71) Applicant: ALPS ELECTRIC CO., LTD., Tokyo (JP)

(72) Inventor: Tatsumaro Yamashita, Miyagi-ken (JP)

(73) Assignee: Alps Electric Co., Ltd., Tokyo (JP)

(*) Notice: Subject to any disclaimer, the term of this patent is extended or adjusted under 35 U.S.C. 154(b) by 168 days.

(21) Appl. No.: 15/060,450

(22) Filed: Mar. 3, 2016

(65) Prior Publication Data
US 2016/0267682 A1   Sep. 15, 2016

(30) Foreign Application Priority Data
Mar. 10, 2015  (JP) ................. 2015-047196

(51) Int. Cl.
- *G01B 11/25* (2006.01)
- *G06K 9/52* (2006.01)
- *G06K 9/00* (2006.01)

(52) U.S. Cl.
CPC ........ *G01B 11/254* (2013.01); *G01B 11/2513* (2013.01); *G06K 9/00335* (2013.01); *G06K 9/52* (2013.01)

(58) Field of Classification Search
CPC ............ G01B 11/25; G01B 11/2513; G06K 9/00335; G06K 9/52
See application file for complete search history.

(56) References Cited

U.S. PATENT DOCUMENTS

| | | | | |
|---|---|---|---|---|
| 2010/0328649 | A1* | 12/2010 | Ota | G01B 11/25 356/73 |
| 2013/0038882 | A1* | 2/2013 | Umeda | G01C 3/08 356/610 |
| 2015/0378080 | A1* | 12/2015 | Georgiou | G02B 5/32 349/62 |
| 2015/0381972 | A1* | 12/2015 | Kowdle | H04N 9/3191 348/51 |

FOREIGN PATENT DOCUMENTS

| | | |
|---|---|---|
| JP | 2006-528770 | 12/2006 |
| JP | 5001286 B | 5/2012 |
| JP | 2014-48124 | 3/2014 |

* cited by examiner

*Primary Examiner* — Christopher Findley
(74) *Attorney, Agent, or Firm* — Beyer Law Group LLP

(57) ABSTRACT

An object detection device includes a light source, an irradiation optical system that converts emitted light from the light source to measurement light having a predetermined pattern and emits the measurement light to a reference surface, and a light reception element that images the reference surface, and includes an imaging member that reads an image captured by the light reception element for each of a plurality of lines extending in a horizontal direction and arranged at predetermined intervals, and a detection unit that detects an object to be measured entering between a pattern forming unit and the reference surface based on image data from the imaging element, in which the pattern includes a plurality of division patterns arranged in the horizontal direction to correspond to the lines in the reference surface.

8 Claims, 3 Drawing Sheets

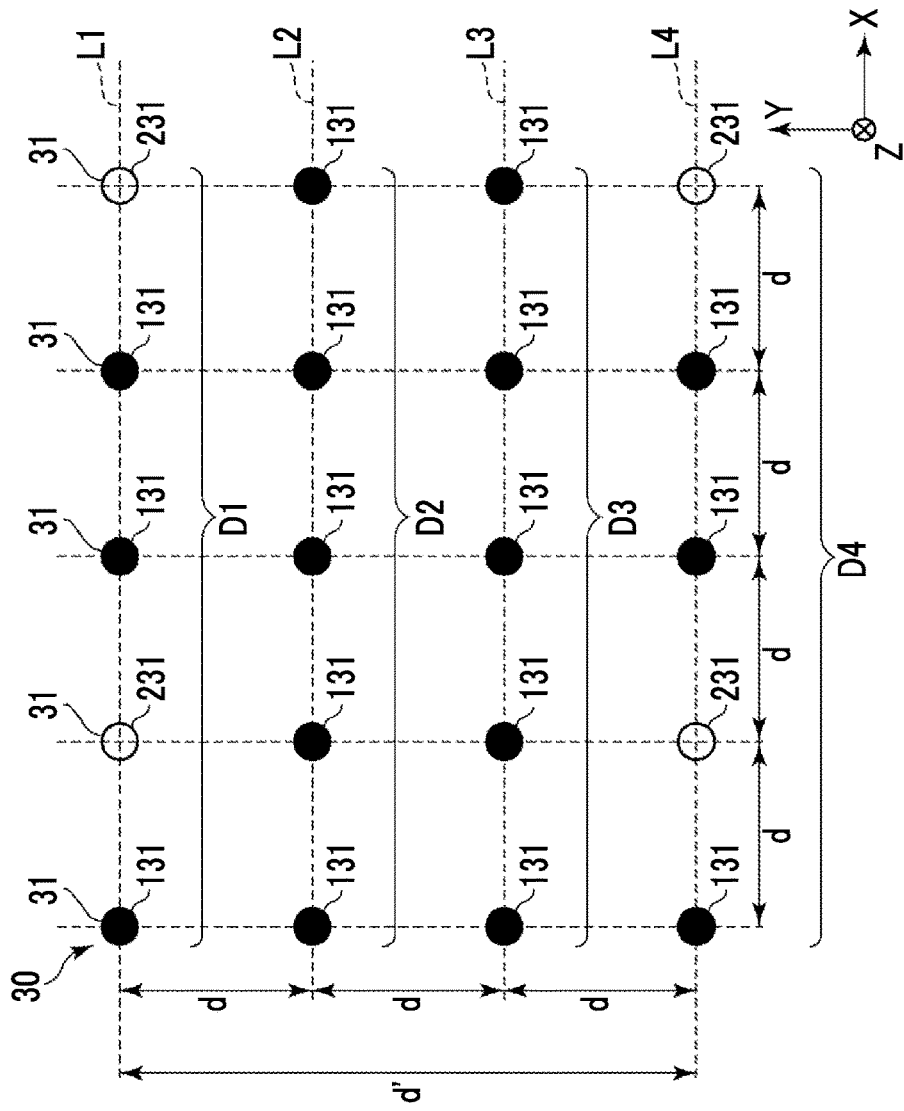

OBJECT DETECTION DEVICE

CLAIM OF PRIORITY

This application claims benefit of Japanese Patent Application No. 2015-047196 filed on Mar. 10, 2015, which is hereby incorporated by reference.

BACKGROUND OF THE INVENTION

1. Field of the Invention

The present invention relates to an object detection device that irradiates an object to be measured with measurement light having a predetermined pattern and detects the object to be measured based on reflected light of the measurement light.

2. Description of the Related Art

In a three-dimensional measurement device disclosed in Japanese Patent No. 5001286, an illumination area is irradiated with a random speckle pattern in which a large number of spot lights generated by a light source are arranged at random, and the light response of the illumination area is detected by an image sensor. Displacement of the speckle pattern is detected in a pattern image obtained when the object to be measured has moved to the illumination area and a reference image of the random speckle pattern when there is no object to be measured, and a three-dimensional map of the object to be measured is constructed using a three-dimensional measurement method. When the three-dimensional map is constructed as above, an imaging unit repeats scanning line by line from one end of the illumination area according to a raster scan scheme to obtain a captured image of the entire illumination area, calculates the displacement of the speckle pattern, and constructs a three-dimensional map of the object to be measured. Further, by comparing the constructed three-dimensional maps in time series, it is possible to calculate a speed at which the object to be measured has moved within the illumination area.

In an object detection device described in Japanese Unexamined Patent Application Publication No. 2014-48124, a configuration in which pupil directions of a light source and an image sensor are made in parallel with each other when a three-dimensional map of an object to be measured is constructed, such that a displacement direction of a speckle pattern is limited to a direction in one axial direction (X-axis) is disclosed. Thus, an amount of displacement of the object to be measured can be calculated by detecting only the displacement along the X-axis and, accordingly, a calculation process can be simplified.

However, in the three-dimensional measurement device disclosed in Japanese Patent No. 5001286, when a movement speed of the object to be measured is calculated, it is necessary to continue to compare three-dimensional maps constructed at predetermined time intervals, each time, and accordingly, a processing load is very high.

Further, even when calculation of the amount of displacement is simplified using the object detection device of Japanese Unexamined Patent Application Publication No. 2014-48124, the three-dimensional map is still used to calculate the movement speed, and accordingly, the processing load is still high.

In particular, in order to accurately construct a three-dimensional map of the object to be measured, it is necessary to increase the number of speckle patterns and densify the speckle patterns. Therefore, an amount of spot lights to be compared on a time axis greatly increases in calculation of a movement speed, and a processing load increases. As a result, when the movement speed of the object to be measured is high, processing cannot keep up and the speed cannot be detected.

SUMMARY OF THE INVENTION

Therefore, the present invention provides an object detection device capable of accurately constructing a three-dimensional map of an object to be measured and easily performing calculation of a movement speed.

An object detection device of the present invention includes a light source, an irradiation optical system that converts emitted light from the light source to measurement light having a predetermined pattern and emits the measurement light to a reference surface, and a light reception element that images the reference surface, and includes an imaging member that reads an image captured by the light reception element for each of a plurality of lines extending in a horizontal direction and arranged at predetermined intervals; and a detection unit that detects an object to be measured entering between a pattern forming unit and the reference surface based on image data from the imaging element, in which the pattern includes a plurality of division patterns arranged in the horizontal direction to correspond to the lines in the reference surface.

Accordingly, since the pattern of the measurement light from the irradiation optical system includes the division patterns corresponding to the lines that are units in which the imaging member reads an image, the detection of the object to be measured can be performed each time the line is read. Accordingly, it is possible to accurately construct a three-dimensional map of the object to be measured and to perform calculation of the shape or the movement speed of the object to be measured easily and rapidly.

In the object detection device of the present invention, it is preferable that the pattern includes at least a dot pattern including both a plurality of first dots and a plurality of second dots, intervals of the plurality of second dots are larger than intervals of the plurality of first dots, the detection unit detects a shape of the object to be measured based on reflected light from the object to be measured in at least the first dots, and the detection unit detects movement information of the object to be measured based on the reflected light from the object to be measured in the second dots.

Accordingly, it is possible to easily perform detection of the shape or the movement information of the object to be measured.

In the object detection device of the present invention, it is preferable that the first dot and the second dot have different characteristic values, and the detection unit discriminates between the first dot and the second dot based on a threshold value for the characteristic value.

Accordingly, since it is possible to clearly discriminate between the first dot and the second dot, it is possible to accurately perform respective detections of the shape and the movement information of the object to be measured.

In the object detection device of the present invention, it is preferable that the light reception element performs imaging for each division pattern.

Since the detection can be performed for each division pattern, it is possible to reduce the burden of a process of calculating the shape or the movement speed of the object to be measured.

In the object detection device of the present invention, it is preferable that the light reception element performs imaging for each of pluralities of division patterns.

It is possible to perform detection of a plurality of division patterns through reading of one line, to obtain a large amount of information, and accordingly, to obtain a more detailed detection result.

In the object detection device of the present invention, it is preferable that the characteristic value is at least one of luminance, dot diameter, shape, lightness, hue, wavelength, and phase.

Accordingly, identification of the pattern can be performed easily and reliably according to measurement conditions or the like.

According to the present invention, it is possible to accurately construct the three-dimensional map of the object to be measured, and easily and rapidly perform calculation of a shape or a movement speed of the object to be measured.

BRIEF DESCRIPTION OF THE DRAWINGS

FIG. 3 is an illustrative diagram illustrating an arrangement of reference dots formed on a reference surface.

DESCRIPTION OF THE PREFERRED EMBODIMENTS

Hereinafter, the object detection device according to an embodiment of the present invention will be described in detail with reference to the drawings.

Figure 1:
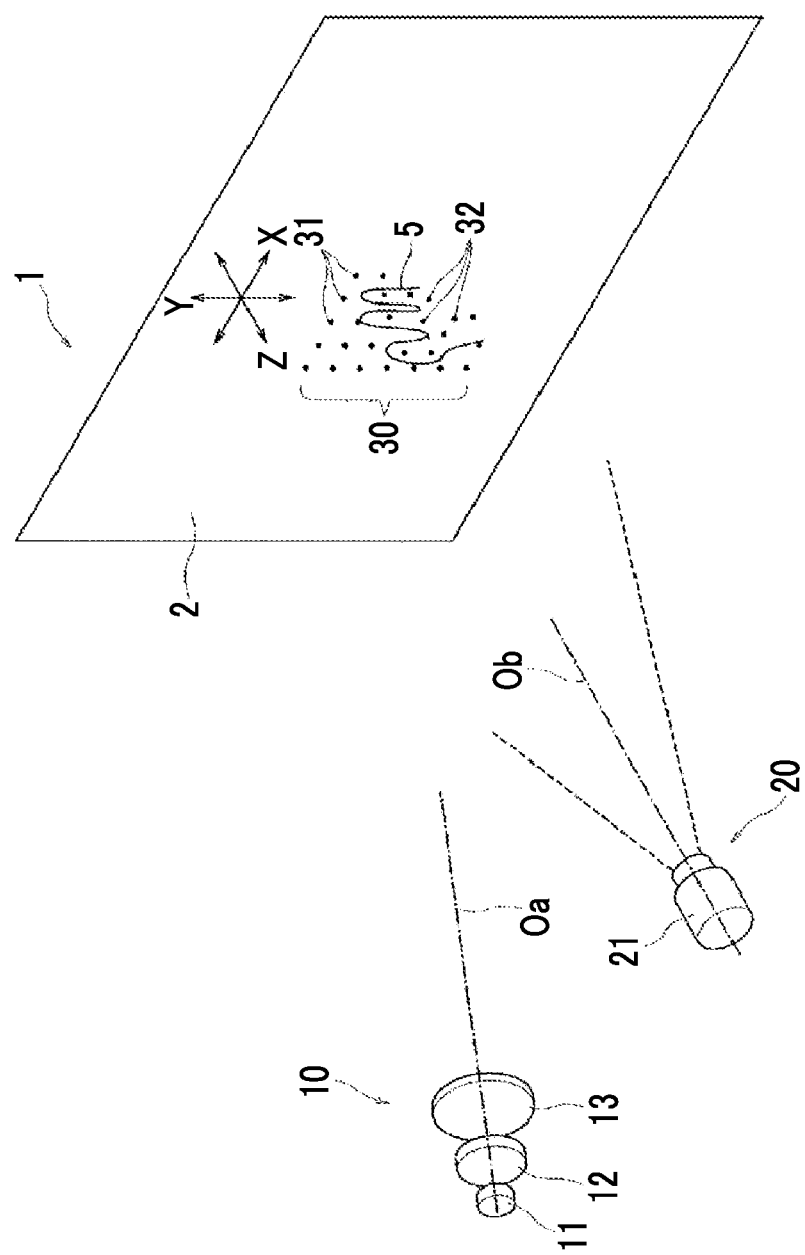
FIG. 1 is a perspective view illustrating an object detection device according to an embodiment of the present invention.
Figure 2:
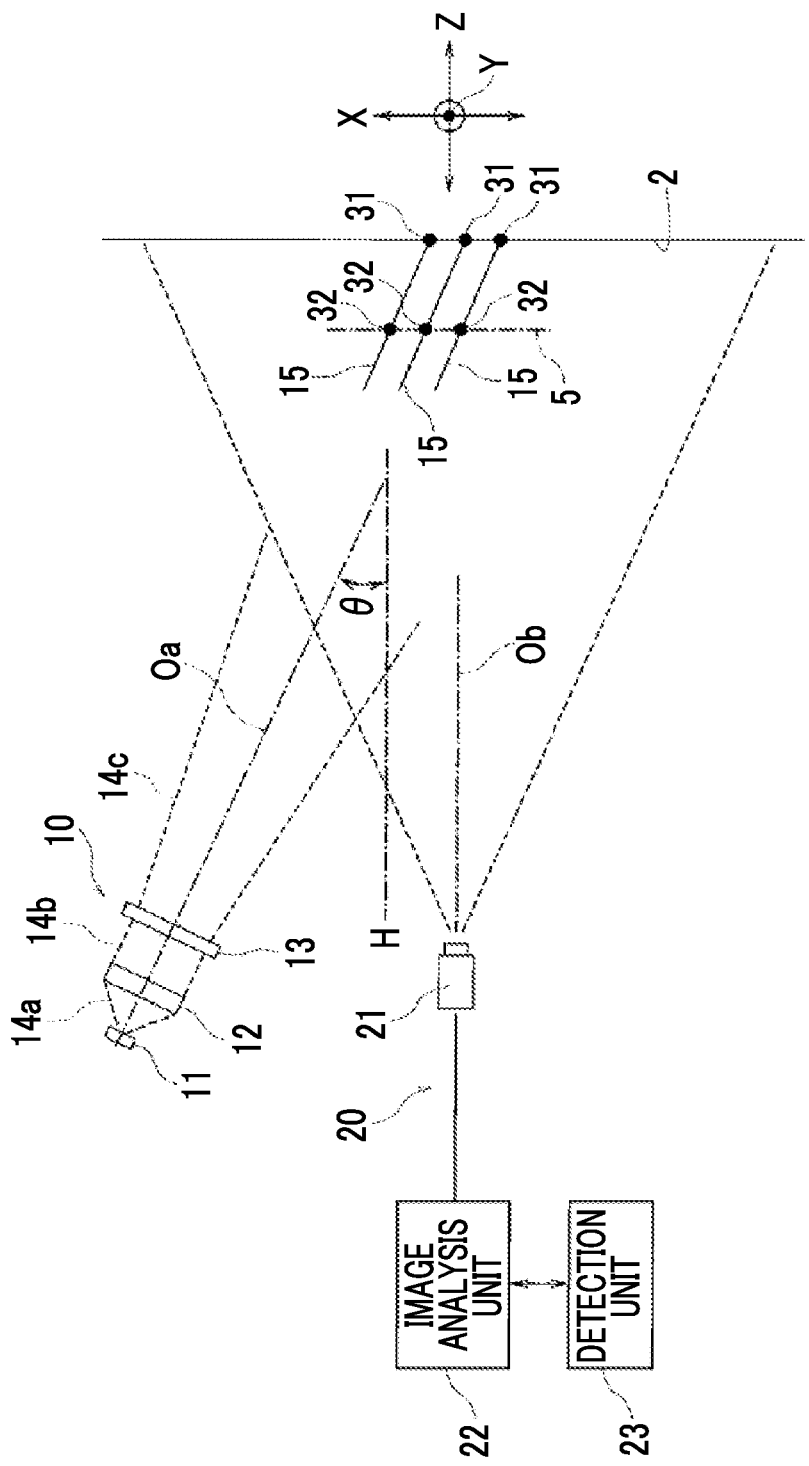
FIG. 2 is a plan view when the object detection device illustrated in FIG. 1 is viewed from above.

An object detection device 1 illustrated in FIGS. 1 and 2 includes a reference surface 2, and a light irradiation member 10 and an imaging member 20 facing the reference surface 2. While the reference surface 2 illustrated in FIGS. 1 and 2 is a plane, the reference surface 2 may be a surface having irregularities.

In FIGS. 1 and 2, X-Y-Z coordinates are illustrated as reference coordinates. An X-Y surface is a surface parallel to the reference surface 2, and an X-Z surface is a surface perpendicular to the reference surface 2. In the following description, an X direction is a horizontal direction in a light reception element of the imaging member 20 and the reference surface 2.

The light irradiation member 10 includes a laser light source 11 that is a coherent light source, a collimator lens 12 that converts a divergent light beam 14a emitted from the laser light source 11 to a parallel light beam 14b, and a transmissive hologram element 13 through which the parallel light beam 14b converted by the collimator lens 12 passes. The laser light source 11 emits laser light in a near infrared wavelength region that is not visible to the human eye. Alternatively, the laser light source 11 may be a laser light source that emits visible laser light. Here, the collimator lens 12 and the hologram element 13 constitute an irradiation optical system that converts the light emitted from the laser light source 11 to measurement light having a predetermined pattern to be described below and emits the measurement light to the reference surface 2.

The hologram element 13 is a phase type diffraction grating. The parallel light beam 14b is diffracted such that an irradiation light beam 14c having a predetermined divergent angle is formed as measurement light. The irradiation light beam 14c is provided to the reference surface 2. When the reference surface 2 is irradiated with the irradiation light beam 14c, a plurality of reference dots 31 are projected on the reference surface 2. The plurality of reference dots 31 are dots formed by the laser light being diffracted by the hologram element 13. In the example illustrated in FIG. 3, the reference dots 31 having a small circle shape are formed in the reference surface 2. The shape of the reference dot 31 is not limited to the small circle, and an arbitrary shape can be selected.

As illustrated in FIG. 3, the reference dots 31, formed on the reference surface 2 that is a plane, are arranged according to a regular projection pattern such that a reference pattern (dot pattern) 30 is formed. Here, "regular" refers to a relationship in which, when attention is focused on any one of the reference dots 31, a relative relationship of a direction and a distance between the reference dot 31 and the other reference dot 31 adjacent in each direction is the same among all other reference dots 31.

In a reference pattern 30 illustrated in FIG. 3, reference dots 31 are arranged in a square grating form arranged at a constant pitch in the X and Y directions. Here, arrays D1, D2, D3, D4, . . . of the reference dots 31 arranged in the X direction are arranged along respective lines L1, L2, L3, L4, . . . which are imaging units of the light reception element of the video camera 21 of the imaging member 20. That is, each of the arrays D1, D2, D3, D4, . . . of the reference dots 31 and each of the lines L1, L2, L3, L4, . . . which are imaging units of the light reception element correspond to each other in one to one correspondence. Each of the arrays D1, D2, D3, D4, . . . of the reference dots 31 constitutes a division pattern, and the reference pattern 30 is configured with all of the division patterns.

As illustrated in FIG. 3, the reference dots 31 include a plurality of first dots (black circles) 131 and a plurality of second dots (white circles) 231, and are arranged at intervals having a uniform pitch d. The second dot 231 is arranged to be interposed between the two first dots 131, and a pitch d' between the second dots 231 is three times the pitch d between the first dots 131. An arrangement interval of the second dots 231 may be arbitrarily set according to a specification of the object detection device. For example, the second dot 231 may be arranged in every three first dots 131. Here, it is preferable for an arrangement density of the first dots 131 (number of arranged first dots per unit area) to be a predetermined multiple of the arrangement density of the second dots 231 and, particularly, 5 to 7 times larger.

The first dots 131 and the second dots 231 have different luminance in the reference surface 2 as the characteristic value by using a different configuration of a diffractive surface of the hologram element 13. The hologram element 13 includes, as the diffractive surface, a first grating shape corresponding to the first dots 131, and a second grating shape corresponding to the second dots 231. It is preferable that the difference in the luminance between the first dot 131 and the second dot 231 has a value such that the difference is not affected by a change in intensity of the reflected light caused by a detection environment or a shape, color, or the like of the object to be measured. For example, the luminance of the second dot 231 may be 1.5 to 10 times the luminance of the first dot 131.

Further, at least one of dot diameter, shape, lightness, hue, wavelength, and phase may be different between the first dot 131 and the second dot 231, in place of the difference in luminance or in addition to the difference in luminance, as the characteristic values of the first dot and the second dot. For example, two light sources capable of forming respective dots having different dot diameters, emission intensity, or the like are prepared, and the light is incident along an optical axis of the collimator lens 12 with time shift. Accordingly, a difference in dot diameter, lightness, wavelength, phase, or the like of the first dot 131 and the second dot 231 can be caused. Further, a filter corresponding to the reference pattern is provided near an emitting surface of the hologram element 13, and by irradiating the reference surface 2 with the light emitted from the hologram element 13 through this filter, a difference in dot diameter, shape, lightness, hue, wavelength, or the like can be caused.

In FIG. 2, an irradiation reference line Oa of an irradiation light beam 14c emitted from the light irradiation member 10 to the reference surface 2 is illustrated. The irradiation reference line Oa matches an optical axis of the laser light source 11, the collimator lens 12, and the hologram element 13. The irradiation reference line Oa is located within the surface parallel to the X-Z surface. As illustrated in the plan view of FIG. 2, the irradiation reference line Oa is arranged at an angle θ smaller than 90° with respect to a vertical line H from the reference surface 2.

Irradiation rays 15 individually corresponding to the respective reference dots 31 are included in the irradiation light beam 14c extending from the hologram element 13 to the reference surface 2. The plurality of reference dots 31 generated due to a diffraction phenomenon of the hologram element 13 are generated at intersections of the respective irradiation rays 15 and the reference surface 2. Since the irradiation light beam 14c is divergent light, the individual irradiation rays 15, strictly, have a diffusion angle. However, by securing a sufficiently long distance between the light irradiation member 10 and the reference surface 2, the irradiation rays 15 can be represented as having a substantially parallel arrangement relationship, as illustrated in FIG. 2.

In FIG. 2, an imaging reference line Ob of the video camera 21 is illustrated. The imaging reference line Ob is a center line of an imaging field of view of the video camera 21 and matches an optical axis of a camera lens. The imaging reference line Ob is located within a surface parallel to the X-Z surface. Within this surface, the imaging reference line Ob is arranged parallel to the vertical line H. As a result, the irradiation reference line Oa and the imaging reference line Ob face each other at an angle θ within the surface parallel to the X-Z surface. In the embodiment illustrated in FIG. 2, the angle θ is an acute angle. As long as the angle is θ, the irradiation reference line Oa may be parallel to the vertical lines H. Both the irradiation reference line Oa and the imaging reference line Ob may not be parallel to the vertical line H. Further, the angle θ is not limited to the acute angle.

In FIG. 1, a state in which the object to be measured 5 enters between the light irradiation member 10 and the reference surface 2 is illustrated. In FIG. 1, the object to be measured 5 is a hand of a person. When the object to be measured 5 enters between the light irradiation member 10 and the reference surface 2, reference dots are projected on a surface of the object to be measured 5. In this specification, the reference dot projected on the surface of the object to be measured 5 is referred to as a moving reference dot 32. As illustrated in FIG. 2, the moving reference dots 32 are generated at intersections of the individual irradiation rays 15 and the surface of the object to be measured 5. A three-dimensional map of the object to be measured can be constructed by the reference dots and the moving reference dots.

As illustrated in FIG. 2, the imaging member 20 includes the video camera 21. The video camera 21 includes a charge coupled device (CCD), and a light reception element such as a complementary metal oxide semiconductor (CMOS). This light reception element images the reference surface 2 for each of a plurality of lines L1, L2, L3, L4, . . . (FIG. 3) extending in the X direction (horizontal direction) and arranged at predetermined intervals, and detects the reflected light from the object to be measured 5 entering between the hologram element 13 and the reference surface 2. An image captured for each line is read into the image analysis unit 22 for each line.

Here, it is preferable for the video camera 21 to include an imaging optical system in which barrel distortion has been suppressed. Further, it is preferable that a filter that corrects the barrel distortion is arranged in place of or in addition to such an imaging optical system, and the barrel distortion is corrected through a correction operation process. By suppressing the barrel distortion, it is possible to obtain a more accurate result of detection.

The light reception element may perform imaging for each of pluralities of division patterns, such as a dot array D1 and a dot array D2 in FIG. 3. In this case, since a plurality of dot arrays are included in one line photographed by the light reception element, it is possible to perform finer detection.

Further, the light reception element may image the reference surface 2 for each of pluralities of lines, or may image all of the lines at one time. Accordingly, it is possible to perform imaging of one frame at a high speed. However, in either case, the captured image is read into the image analysis unit 22 for each line.

In the image analysis unit 22, the image captured by the light reception element is stored for each line, new and old images of the same line are compared with each other, it is determined which of dot images has moved through analysis, and a result of the analysis is sent to the detection unit 23. The detection unit 23 detects a shape and movement information of the object to be measured based on the reflected light detected by the light reception element. Therefore, in an object detection device of the related art, an entire screen is accumulated in a frame memory for one frame, and then, a detection operation is performed for each frame, whereas in the object detection device 1 of this embodiment, since a dot image and an epipolar line regarding the movement of the dot image are arranged along an image scan line, detection can be performed using a line memory. That is, since it is not necessary to wait for all lines of a new image to be read into the image analysis unit 22 and analysis is performed at a time point at which information of a desired line has been stored, it is possible to speed up the process. Further, even when there is a bent distortion or the like in a wide angle lens or the like, if arrangement conversion is performed using a look-up table or the like for each pixel in advance, the process can be similarly performed line by line.

For the image of each line output from the image analysis unit 22, the detection unit 23 discriminates between the first dot 131 and the second dot 231 based on a predetermined threshold value. More specifically, the detection unit 23 determines that a dot having luminance higher than the threshold value is the second dot 231, and determines that a dot having luminance lower than or equal to the threshold is the first dot 131.

After discrimination between the first dot 131 and the second dot 231, the detection unit 23 detects the shape of the object to be measured 5 based on the reflected light at the first dot 131, and detects the movement information of the object to be measured 5 based on the reflected light of the second dot 231. More specifically, beginning with detection data of the first dot 131 and the second dot 231 in an initial state at the time of start-up of the device, the detection unit 23 sequentially updates detection data of each time as a look-up table, stores the detection data in a memory of the image analysis unit 22, compares the data of this look-up table with latest detection data for each dot, and detects that the object to be measured 5 has entered between the imaging member 20 and the reference surface 2 or that the object to be measured 5 has moved between the imaging member 20 and the reference surface 2 when the dot has moved by a predetermined amount or more.

Here, the mobile information includes a moving amount or a moving direction within a plane corresponding to the reference surface 2 for each of the plurality of second dots 231.

In the object detection device 1, each of the columns D1, D2, D3, D4, . . . of the reference dots 31 and each of the lines L1, L2, L3, L4, . . . that are imaging units of the light reception element correspond to each other in one-to-one correspondence, and the object to be measured can be detected for each line. Therefore, it is possible to perform the detection of the object to be measured without waiting for the image data of the entire screen of one frame to be read into the image analysis unit 22, and accordingly, to perform the detection of the object to be measured by comparing respective dots of new and old lines. Accordingly, it is possible to easily and rapidly perform the calculation of the shape or the movement information of the object to be measured. Further, by updating the detection data for each line, it is possible to sequentially update the three-dimensional map of the object to be measured.

Further, by causing the intervals of the second dots 231 for detecting the movement information to be greater than the intervals of the first dots 131 for detecting the shape of the object to be measured 5, it is possible to reliably detect the movement information of the object to be measured 5, even when the object to be measured 5 has moved by a predetermined amount, such as an amount greater than the intervals of the first dots 131.

In the object detection device 1, the image is acquired for each line by the imaging member 20 in a state in which the dot pattern is projected on the reference surface 2. In the object detection device 1, the dot image and an epipolar line regarding the movement of the dot image are arranged along an image scanning line, and the detection is performed using a line memory. For the image acquired for each line, the image analysis unit 22 compares the new and old images of the same line and determines which of the dots has moved through analysis. The analysis of the movement of the dots is performed, for example, based on the movement distance of the dot on the epipolar line using the fact that the movement of the dot image due to the object to be measured 5 entering between the imaging member 20 and the reference surface 2 or due to the object to be measured 5 between the imaging member 20 and the reference surface 2 being moved occurs on the epipolar line passing through above the dot image of an immediately previous line while the image of adjacent lines is acquired. Therefore, in an object detection device of the related art, an entire screen is accumulated in a frame memory for one frame, and then, a detection operation is performed for each frame, whereas in the object detection device 1 of this embodiment, since it is not necessary to wait for all lines of a new image to be read into the image analysis unit 22 and analysis is performed at a time point at which information of a desired line has been stored, it is possible to speed up the process. Further, even when there is a bent distortion or the like in a wide angle lens or the like, if arrangement conversion is performed using a look-up table or the like for each pixel in advance, the process can be similarly performed line by line.

While the present invention has been described with reference to the above-described embodiments, the present invention is not limited to the above-described embodiments, and may be improved or modified within the scope of the object of improvement or the spirit of the present invention. Thus, the object detection device according to the embodiment of the present invention is useful to reduce the burden of the calculation process in the detection of the shape or the movement information of the object to be measured.

It should be understood by those skilled in the art that various modifications, combinations, sub-combinations and alterations may occur depending on design requirements and other factors insofar as they are within the scope of the appended claims of the equivalents thereof.

What is claimed is:

1. An object detection device, comprising:
  a light source configured to emit light;
  an irradiation optical system configured to convert the light emitted from the light source to measurement light having a predetermined pattern, and emit the measurement light to a reference surface, the predetermined pattern including a plurality of dot patterns each arranged in a horizontal direction;
  an imaging device including a light reception element configured to capture an image by receiving the measurement light reflected by the reference surface or an object entered between the irradiation optical system and the reference surface, the imaging device reading the captured image line by line along a plurality of lines extending in the horizontal direction and arranged at a predetermined interval so as to output image data, the plurality of lines and the predetermined interval corresponding to the arrangement of the dot patterns;
  an image analysis unit configured to receive the image data line by line, and store the image data in a memory line by line, the image analysis unit comparing a dot image in a current line of the image data being received with a dot image in a corresponding line of previous image data to determine which dot image has moved in the current line; and
  a detection unit configured to detect the object based on movement of the dot image in the current line of the image data being received from the imaging device.

2. The object detection device according to claim 1, wherein the predetermined pattern of the measurement light forms, on the reference surface, at least a dot pattern of a plurality of dots arranged with a uniform pitch in a plurality of arrays, each array corresponding to one of the plurality of dot patterns, the plurality of dots including:
  a plurality of first dots having a first interval; and
  a plurality of second dots having a second interval greater than the first interval,
  and wherein the detection unit is further configured to detect a shape of the object based on the first dots of the measurement light reflected from the object, and to detect a movement of the object based on the second dots of the measurement light reflected from the object.

3. The object detection device according to claim 1, wherein the predetermined pattern of the measurement light forms, on the reference surface, at least a dot pattern of a plurality of dots arranged with a uniform pitch in a plurality of arrays, each array corresponding to one of the plurality of dot patterns, the plurality of dots including:
a plurality of first dots having a first interval; and
a plurality of second dots having a second interval greater than the first interval,
wherein the plurality of first dots have at least one first characteristic value, and the plurality of second dots have at least one second characteristic value different from the first characteristic value, and
wherein the detection unit is further configured to distinguish the first dots and the second dots from each other based on a threshold value between the first and second characteristic values.

4. The object detection device according to claim 1, wherein the light reception element captures the image by each of the dot patterns.

5. The object detection device according to claim 1, wherein the light reception element captures the image by two or more of the plurality of the dot patterns.

6. The object detection device according to claim 3, wherein the first and second characteristic values are values of at least one of luminance, a dot diameter, a shape, lightness, hue, a wavelength, and a phase.

7. The object detection device according to claim 1, wherein the predetermined pattern of the measurement light forms, on the reference surface, a dot pattern of a plurality of dots arranged with a uniform pitch in a plurality of arrays, each array corresponding to one of the plurality of dot patterns, the plurality of dots including:
a plurality of first dots having a first interval; and
a plurality of second dots having a second interval greater than the first interval,
and wherein the irradiation optical system includes a hologram element having:
a first grating shape corresponding to the plurality of first dots; and
a second grating shape corresponding to the plurality of second dots.

8. The object detection device according to claim 1, wherein the detection unit is capable of detecting the object by the current line of the image data stored in the memory before remaining portion of the image data is received and stored in the image analysis unit.

* * * * *